United States Patent
Kubo et al.

(10) Patent No.: US 11,551,163 B2
(45) Date of Patent: Jan. 10, 2023

(54) CONTROL APPARATUS, SYSTEM, NON-TRANSITORY COMPUTER READABLE MEDIUM, TERMINAL APPARATUS, AND ANNOUNCEMENT METHOD

(71) Applicant: TOYOTA JIDOSHA KABUSHIKI KAISHA, Toyota (JP)

(72) Inventors: Chikage Kubo, Chofu (JP); Yusuke Kobayashi, Ota-ku (JP); Minoru Kubota, Toyota (JP); Kentaro Takahashi, Toyota (JP); Hideo Hasegawa, Nagoya (JP); Takashi Horiguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 90 days.

(21) Appl. No.: 17/101,474

(22) Filed: Nov. 23, 2020

(65) Prior Publication Data
US 2021/0158230 A1    May 27, 2021

(30) Foreign Application Priority Data

Nov. 22, 2019  (JP) .............................. JP2019-211734

(51) Int. Cl.
| | | |
|---|---|---|
| G06Q 10/02 | (2012.01) | |
| G06Q 10/10 | (2012.01) | |
| G06Q 50/30 | (2012.01) | |
| H04W 4/021 | (2018.01) | |
| H04W 4/12 | (2009.01) | |

(52) U.S. Cl.
CPC .......... *G06Q 10/02* (2013.01); *G06Q 10/109* (2013.01); *G06Q 50/30* (2013.01); *H04W 4/021* (2013.01); *H04W 4/12* (2013.01)

(58) Field of Classification Search
CPC ...... G06Q 10/02; G06Q 10/109; G06Q 50/30; H04W 4/021; H04W 4/12
USPC ............................................................ 705/5
See application file for complete search history.

(56) References Cited

U.S. PATENT DOCUMENTS

| | | | |
|---|---|---|---|
| 10,354,278 B2 * | 7/2019 | Silvestro ............ | G06Q 30/0261 |
| 10,552,773 B1 * | 2/2020 | Shah ...................... | G06N 7/005 |
| 11,227,592 B1 * | 1/2022 | Kockerbeck ........ | G10L 15/1815 |

(Continued)

FOREIGN PATENT DOCUMENTS

| | | |
|---|---|---|
| JP | 2018-181241 A | 11/2018 |
| JP | 2019-505899 A | 2/2019 |
| WO | 2017/117095 A1 | 7/2017 |

OTHER PUBLICATIONS

"Restaurant table reservation using time-series prediction" Published by IEEE (Year: 2017).*

(Continued)

*Primary Examiner* — Zeina Elchanti
(74) *Attorney, Agent, or Firm* — Oliff PLC

(57) ABSTRACT

The control apparatus includes a controller configured to acquire time slot data indicating an available time slot at a place that provides a service, and generate announcement data announcing a proposal to take a user to the place using a vehicle should the user reserve the time slot indicated by the time slot data, and a communication interface configured to transmit the announcement data generated by the controller to a terminal apparatus configured to present content of data to the user.

12 Claims, 9 Drawing Sheets

(56) References Cited

U.S. PATENT DOCUMENTS

| | | | | |
|---|---|---|---|---|
| 2012/0101901 | A1* | 4/2012 | Depasquale | G06Q 30/0271 |
| | | | | 705/14.58 |
| 2015/0248689 | A1* | 9/2015 | Paul | G06Q 50/30 |
| | | | | 705/14.23 |
| 2016/0217510 | A1* | 7/2016 | Brown | G06Q 30/0284 |
| 2016/0353249 | A1* | 12/2016 | Khatam | H04W 4/30 |
| 2017/0178183 | A1* | 6/2017 | Raji | G06Q 30/0252 |
| 2018/0130160 | A1* | 5/2018 | Alexander | G06Q 20/12 |
| 2018/0182055 | A1* | 6/2018 | Jepson | G16H 10/60 |
| 2018/0300339 | A1* | 10/2018 | Landowski | H04L 51/02 |
| 2018/0357668 | A1* | 12/2018 | Kanemoto | G06Q 30/0254 |
| 2019/0065969 | A1* | 2/2019 | Shaw | H04N 21/4126 |
| 2019/0228461 | A1* | 7/2019 | Domokos | G06Q 30/0201 |
| 2019/0256107 | A1* | 8/2019 | Park | B60W 50/14 |
| 2022/0076282 | A1* | 3/2022 | Monassebian | G06Q 20/3255 |

OTHER PUBLICATIONS

Accenture Strategy Consulting Headquarters, "4-3 Three Approaches Google is Targeting in the Mobility Domain," Mobility 3.0, Toyo Keizai, Jun. 13, 2019, pp. 166-176.

English translation of relevant part of Oct. 4, 2022 Office Action issued in Japanese Patent Application No. 2019-211734 (obtained from One Portal Dossier (OPD)).

\* cited by examiner

CONTROL APPARATUS, SYSTEM, NON-TRANSITORY COMPUTER READABLE MEDIUM, TERMINAL APPARATUS, AND ANNOUNCEMENT METHOD

CROSS-REFERENCE TO RELATED APPLICATION

This application claims priority to Japanese Patent Application No. 2019-211734, filed on Nov. 22, 2019, the entire contents of which are incorporated herein by reference.

TECHNICAL FIELD

The present disclosure relates to a control apparatus, a system, a program, a terminal apparatus, and an announcement method.

BACKGROUND

In the technology described in Patent Literature (PTL) 1, when a reservation is cancelled at the last minute at a restaurant, vacant seat information transmitted from the restaurant is immediately notified to a terminal device of a member.

CITATION LIST

Patent Literature

PTL 1: JP 2018-181241 A

SUMMARY

In the technology described in PTL 1, motivation of a member who has browsed vacant seat information is insufficient.

It would be helpful to strongly motivate a user to reserve an available time slot.

A control apparatus according to the present disclosure includes:

a controller configured to acquire time slot data indicating an available time slot at a place that provides a service, and generate announcement data announcing a proposal to take a user to the place using a vehicle should the user reserve the time slot indicated by the time slot data; and a communication interface configured to transmit the announcement data generated by the controller to a terminal apparatus configured to present content of data to the user.

A program according to the present disclosure is configured to cause a computer to execute operations, the operations including:

receiving announcement data announcing a proposal to take a user to a place that provides a service, using a vehicle, should the user reserve an available time slot at the place; and presenting content of the received announcement data to the user.

An announcement method according to the present disclosure includes:

transmitting, from a control apparatus to a terminal apparatus, announcement data announcing a proposal to take a user to a place that provides a service, using a vehicle, should the user reserve an available time slot at the place; and presenting content of the announcement data to the user via the terminal apparatus.

According to the present disclosure, it is possible to strongly motivate a user to reserve an available time slot.

DETAILED DESCRIPTION

Figure 1:
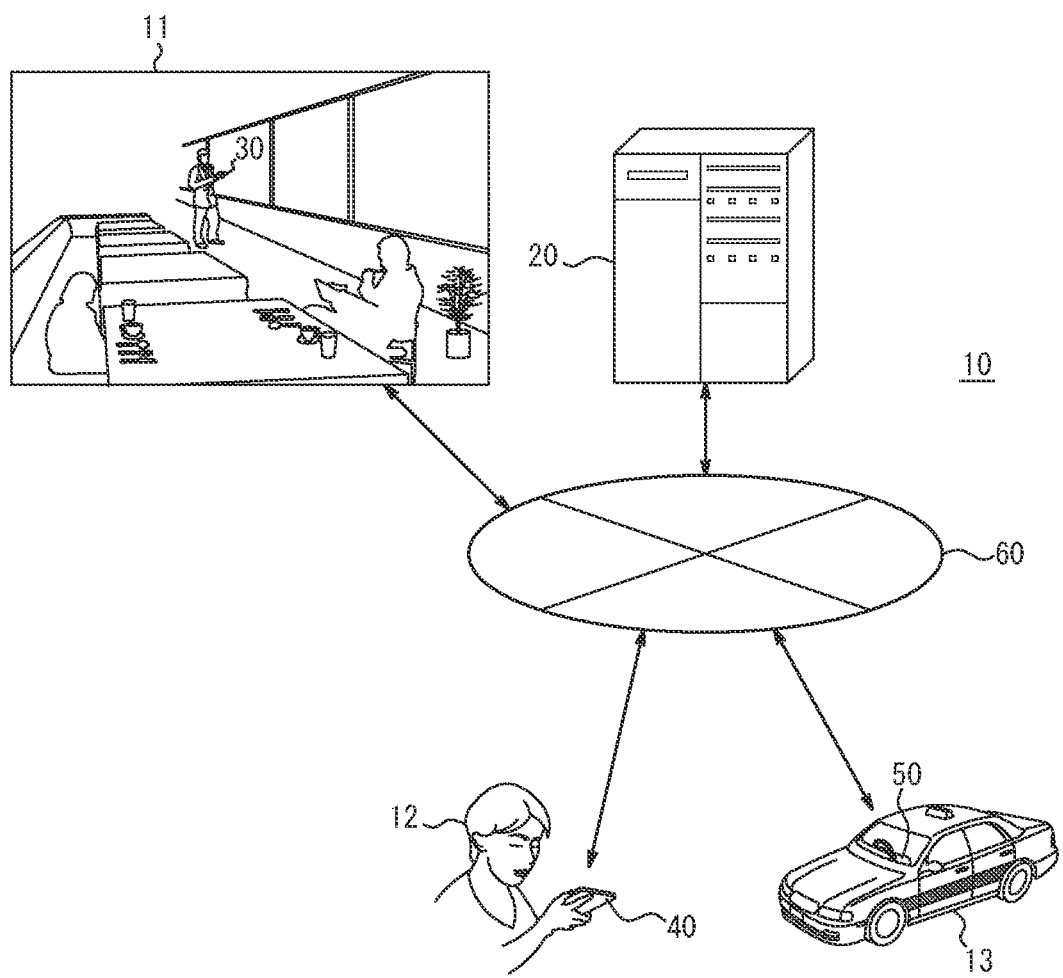
FIG. 1 is a diagram illustrating a configuration of a system according to an embodiment of the present disclosure.

Hereinafter, an embodiment of the present disclosure will be described with reference to the drawings.

In the drawings, the same or corresponding portions are denoted by the same reference numerals. In the descriptions of the present embodiment, detailed descriptions of the same or corresponding portions are omitted or simplified, as appropriate.

A configuration of a system 10 according to the present embodiment will be described with reference to FIG. 1.

The system 10 according to the present embodiment includes a control apparatus 20, at least one first terminal apparatus 30, at least one second terminal apparatus 40, and at least one third terminal apparatus 50.

The control apparatus 20 can communicate with the first terminal apparatus 30, the second terminal apparatus 40, and the third terminal apparatus 50 via a network 60 such as the Internet.

The control apparatus 20 is installed in a facility such as a data center. The control apparatus 20 is, for example, a server that belongs to a cloud computing system or another type of computing system.

The first terminal apparatus 30 is held by a staff member of a place 11 that provides a service, such as a restaurant, a beauty salon, a hotel, a clinic, a hospital, a bank, a sports facility, a leisure facility, or an educational facility. Alternatively, the first terminal apparatus 30 is installed at the place 11. The first terminal apparatus 30 is, for example, a mobile device such as a mobile phone, a smartphone, or a tablet, or a PC. The term "PC" is an abbreviation of personal computer.

The second terminal apparatus 40 is held by a user 12. Alternatively, the second terminal apparatus 40 is installed at a location at which the user 12 is present or a location through which the user 12 passes. The location at which the second terminal apparatus 40 is installed is preferably a crowded location such as a station or a shopping mall. The second terminal apparatus 40 is, for example, a mobile device such as a mobile phone, a smartphone, or a tablet, a PC, or a digital signage device.

The third terminal apparatus 50 is mounted or installed in a vehicle 13 such as a taxi or an on-demand bus. Alternatively, the third terminal apparatus 50 is held by a driver of the vehicle 13. The third terminal apparatus 50 is, for example, a vehicle-mounted device such as a car navigation device, a mobile device such as a mobile phone, a smartphone, or a tablet, or a PC.

The vehicle 13 is, for example, any type of automobile such as a gasoline vehicle, a diesel vehicle, an HV, a PHV, an EV, or an FCV. The term "HV" is an abbreviation of hybrid vehicle. The term "PHV" is an abbreviation of plug-in hybrid vehicle. The term "EV" is an abbreviation of electric vehicle. The term "FCV" is an abbreviation of fuel cell vehicle. The vehicle 13 is driven by a driver in the present embodiment, but the driving may be automated at any level. The automation level is, for example, any one of Level 1 to Level 5 according to the level classification defined by SAE. The name "SAE" is an abbreviation of Society of Automotive Engineers. The vehicle 13 may be a MaaS-dedicated vehicle. The term "MaaS" is an abbreviation of Mobility as a Service.

An outline of the present embodiment will be described with reference to FIG. 1.

In the system 10 according to the present embodiment, announcement data D5 announcing a proposal to take a user 12 to a place 11 that provides a service, using the vehicle 13, should the user 12 reserve an available time slot at the place 11 are transmitted from the control apparatus 20 to the second terminal apparatus 40. The content of the announcement data D5 is presented to the user 12 via the second terminal apparatus 40.

According to the present embodiment, it is possible to strongly motivate the user 12 to reserve the available time slot by proposing that a ride on the vehicle 13 be given to any user who reserves the available time slot. As a result, available time slots may be more likely to be filled.

Figure 2:
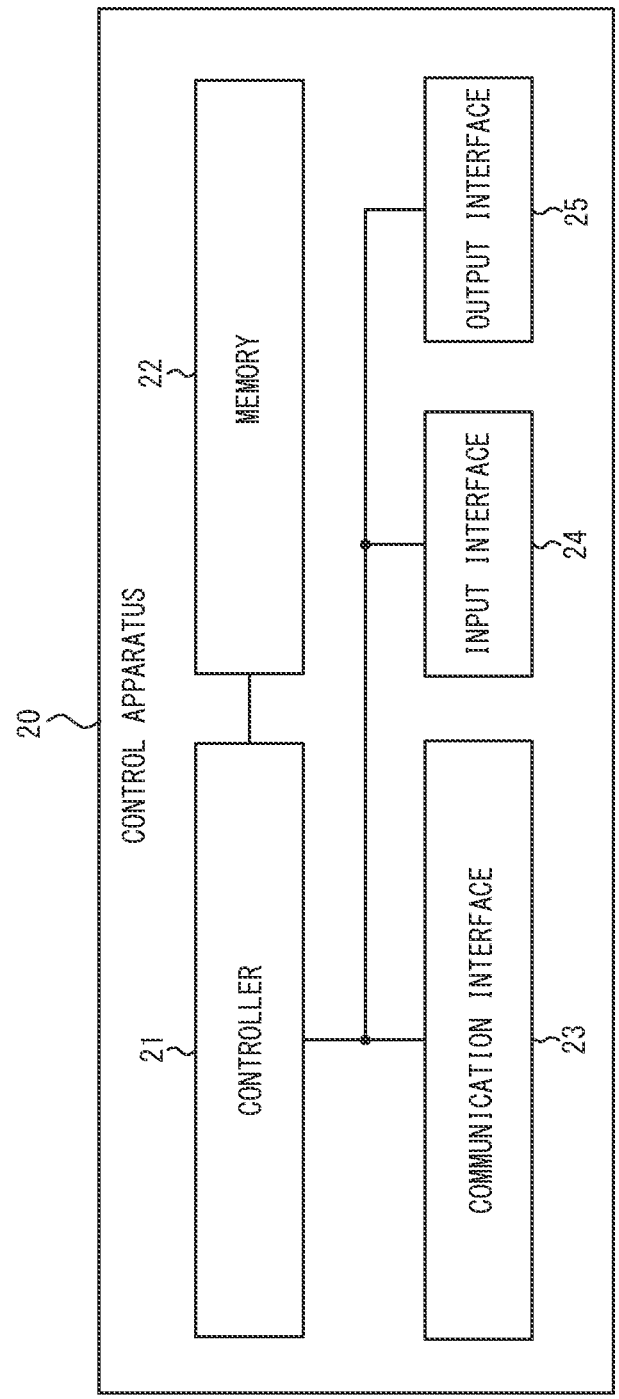
FIG. 2 is a block diagram illustrating a configuration of a control apparatus according to the embodiment of the present disclosure.

A configuration of the control apparatus 20 according to the present embodiment will be described with reference to FIG. 2.

The control apparatus 20 includes a controller 21, a memory 22, a communication interface 23, an input interface 24, and an output interface 25.

The controller 21 includes at least one processor, at least one dedicated circuit, or a combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The dedicated circuit is, for example, an FPGA or an ASIC. The term "FPGA" is an abbreviation of field-programmable gate array. The term "ASIC" is an abbreviation of application specific integrated circuit. The controller 21 executes processes related to operations of the control apparatus 20 while controlling each component of the control apparatus 20.

The memory 22 includes at least one semiconductor memory, at least one magnetic memory, at least one optical memory, or a combination of at least two of these. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 22 functions as, for example, a main memory, an auxiliary memory, or a cache memory. The memory 22 stores data to be used for the operations of the control apparatus 20 and data obtained by the operations of the control apparatus 20.

The communication interface 23 includes at least one interface for communication. The interface for communication is, for example, a LAN interface. The term "LAN" is an abbreviation of local area network. The communication interface 23 receives data to be used for the operations of the control apparatus 20, and transmits data obtained by the operations of the control apparatus 20.

The input interface 24 includes at least one interface for input. The interface for input is, for example, a physical key, a capacitive key, a pointing device, a touch screen integrally provided with a display, or a microphone. The input interface 24 accepts an operation for inputting data to be used for the operations of the control apparatus 20. The input interface 24, instead of being included in the control apparatus 20, may be connected to the control apparatus 20 as an external input device. As the connection method, any technology such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 25 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescence. The output interface 25 outputs data obtained by the operations of the control apparatus 20. The output interface 25, instead of being included in the control apparatus 20, may be connected to the control apparatus 20 as an external output device. As the connection method, any technology such as USB, HDMI®, or Bluetooth® can be used.

The functions of the control apparatus 20 are realized by execution of a control program according to the present embodiment by a processor corresponding to the controller 21. That is, the functions of the control apparatus 20 are realized by software. The control program causes a computer to execute the operations of the control apparatus 20, thereby causing the computer to function as the control apparatus 20. That is, the computer executes the operations of the control apparatus 20 in accordance with the control program to thereby function as the control apparatus 20.

The program can be recorded on a computer readable recording medium. The computer readable recording medium is, for example, a magnetic recording device, an optical disc, a magneto-optical recording medium, or a semiconductor memory. The program is distributed, for example, by selling, transferring, or lending a portable recording medium such as a DVD or a CD-ROM on which the program is recorded. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

The computer temporarily stores in a main memory, for example, a program recorded on a portable recording medium, or a program transferred from the server. Then, the computer reads the program stored in the main memory using a processor, and executes processes in accordance with the read program using the processor. The computer may read a program directly from the portable recording medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the control apparatus 20 may be realized by a dedicated circuit corresponding to the controller 21. That is, some or all of the functions of the control apparatus 20 may be realized by hardware.

Figure 3:
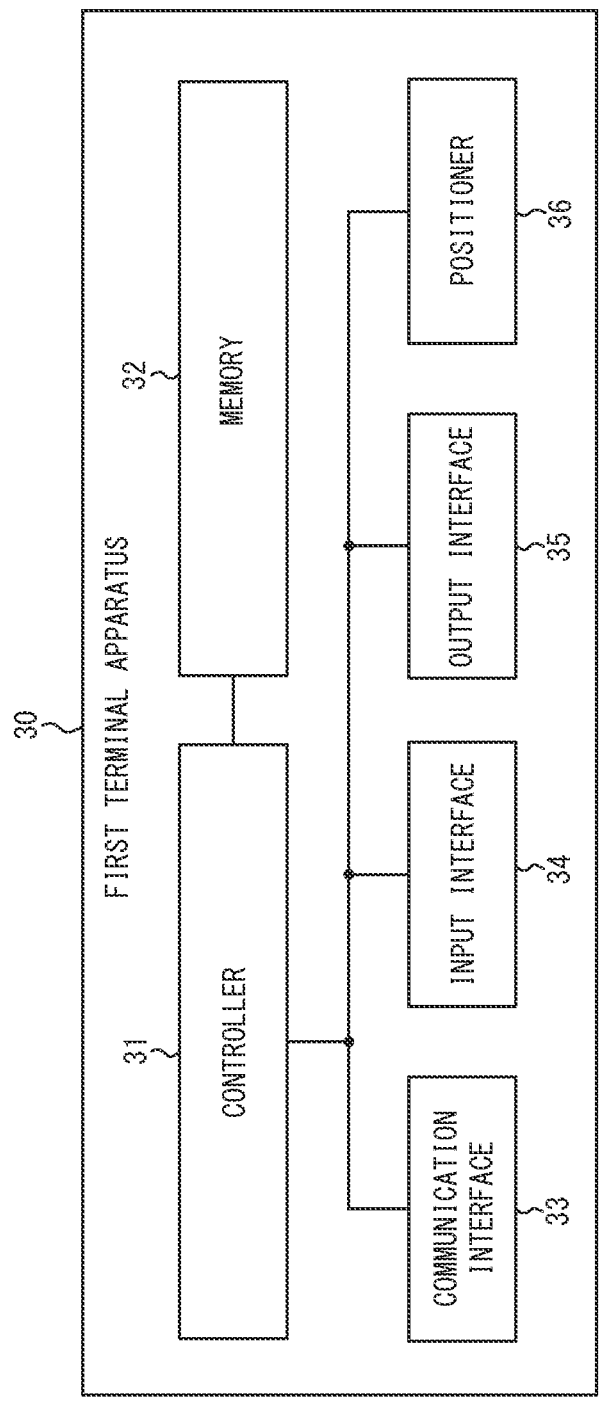
FIG. 3 is a block diagram illustrating a configuration of a first terminal apparatus according to the embodiment of the present disclosure.

A configuration of the first terminal apparatus 30 according to the present embodiment will be described with reference to FIG. 3.

The first terminal apparatus 30 includes a controller 31, a memory 32, a communication interface 33, an input interface 34, an output interface 35, and a positioner 36.

The controller 31 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 31 executes processes related to operations of the first terminal apparatus 30 while controlling each component of the first terminal apparatus 30.

The memory 32 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The term "LTE" is an abbreviation of Long Term Evolution. The term "4G" is an abbreviation of 4th generation. The term "5G" is an abbreviation of 5th generation. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, or a microphone. The input interface 34 accepts an operation for inputting data to be used for the operations of the first terminal apparatus 30. The input interface 34, instead of being included in the first terminal apparatus 30, may be connected to the first terminal apparatus 30 as an external input device. As the connection method, any technology such as USB, HDMI®, or Bluetooth® can be used.

The output interface 35 includes at least one interface for output. The interface for output is, for example, a display or a speaker. The display is, for example, an LCD or an organic EL display. The output interface 35 outputs data obtained by the operations of the first terminal apparatus 30. The output interface 35, instead of being included in the first terminal apparatus 30, may be connected to the first terminal apparatus 30 as an external output device. As the connection method, any technology such as USB, HDMI®, or Bluetooth® can be used.

The positioner 36 includes at least one GNSS receiver. The term "GNSS" is an abbreviation of global navigation satellite system. GNSS includes, for example, GPS, QZSS, GLONASS, and/or Galileo. The term "GPS" is an abbreviation of Global Positioning System. The term "QZSS" is an abbreviation of Quasi-Zenith Satellite System. QZSS satellites are called quasi-zenith satellites. The term "GLONASS" is an abbreviation of Global Navigation Satellite System. The positioner 36 measures the position of the first terminal apparatus 30.

The functions of the first terminal apparatus 30 are realized by execution of a first terminal program according to the present embodiment by a processor corresponding to the controller 31. That is, the functions of the first terminal apparatus 30 are realized by software. The first terminal program causes a computer to execute the operations of the first terminal apparatus 30, thereby causing the computer to function as the first terminal apparatus 30. That is, the computer executes the operations of the first terminal apparatus 30 in accordance with the first terminal program to thereby function as the first terminal apparatus 30.

Some or all of the functions of the first terminal apparatus 30 may be realized by a dedicated circuit corresponding to the controller 31. That is, some or all of the functions of the first terminal apparatus 30 may be realized by hardware.

Figure 4:
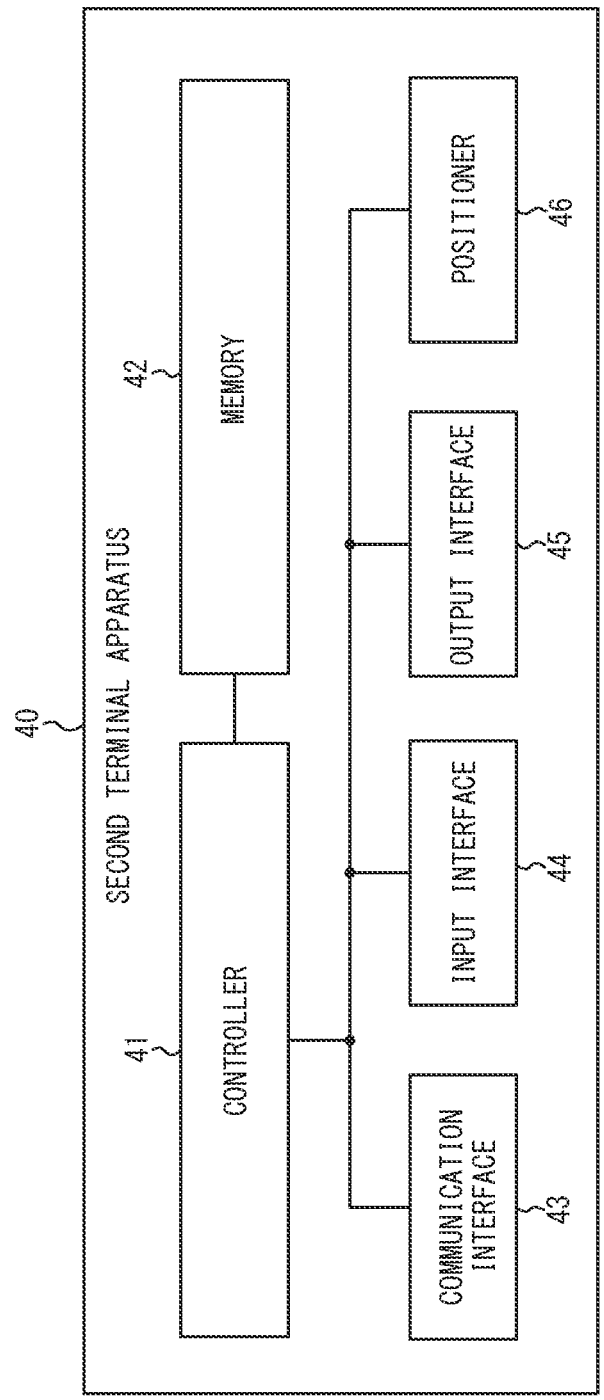
FIG. 4 is a block diagram illustrating a configuration of a second terminal apparatus according to the embodiment of the present disclosure.

A configuration of the second terminal apparatus 40 according to the present embodiment will be described with reference to FIG. 4.

The second terminal apparatus 40 includes a controller 41, a memory 42, a communication interface 43, an input interface 44, an output interface 45, and a positioner 46.

The controller 41 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 41 executes processes related to operations of the second terminal apparatus 40 while controlling each component of the second terminal apparatus 40.

The memory 42 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with a display, or a microphone. The input interface 44 accepts an operation for inputting data to be used for the operations of the second terminal apparatus 40. The input interface 44, instead of being included in the second terminal apparatus 40, may be connected to the second terminal apparatus 40 as an external input device. As the connection method, any technology such as USB, HDMI®, or Bluetooth® can be used.

The output interface 45 includes at least one interface for output. The interface for output is, for example, a display or a speaker. The display is, for example, an LCD or an organic EL display. The output interface 45 outputs data obtained by the operations of the second terminal apparatus 40. The output interface 45, instead of being included in the second terminal apparatus 40, may be connected to the second terminal apparatus 40 as an external output device. As the connection method, any technology such as USB, HDMI®, or Bluetooth® can be used.

The positioner 46 includes at least one GNSS receiver. GNSS includes, for example, GPS, QZSS, GLONASS, and/or Galileo. The positioner 46 measures the position of the second terminal apparatus 40.

The functions of the second terminal apparatus 40 are realized by execution of a second terminal program according to the present embodiment by a processor corresponding to the controller 41. That is, the functions of the second terminal apparatus 40 are realized by software. The second terminal program causes a computer to execute the operations of the second terminal apparatus 40, thereby causing the computer to function as the second terminal apparatus 40. That is, the computer executes the operations of the second terminal apparatus 40 in accordance with the second terminal program to thereby function as the second terminal apparatus 40.

Some or all of the functions of the second terminal apparatus 40 may be realized by a dedicated circuit corresponding to the controller 41. That is, some or all of the functions of the second terminal apparatus 40 may be realized by hardware.

Figure 5:
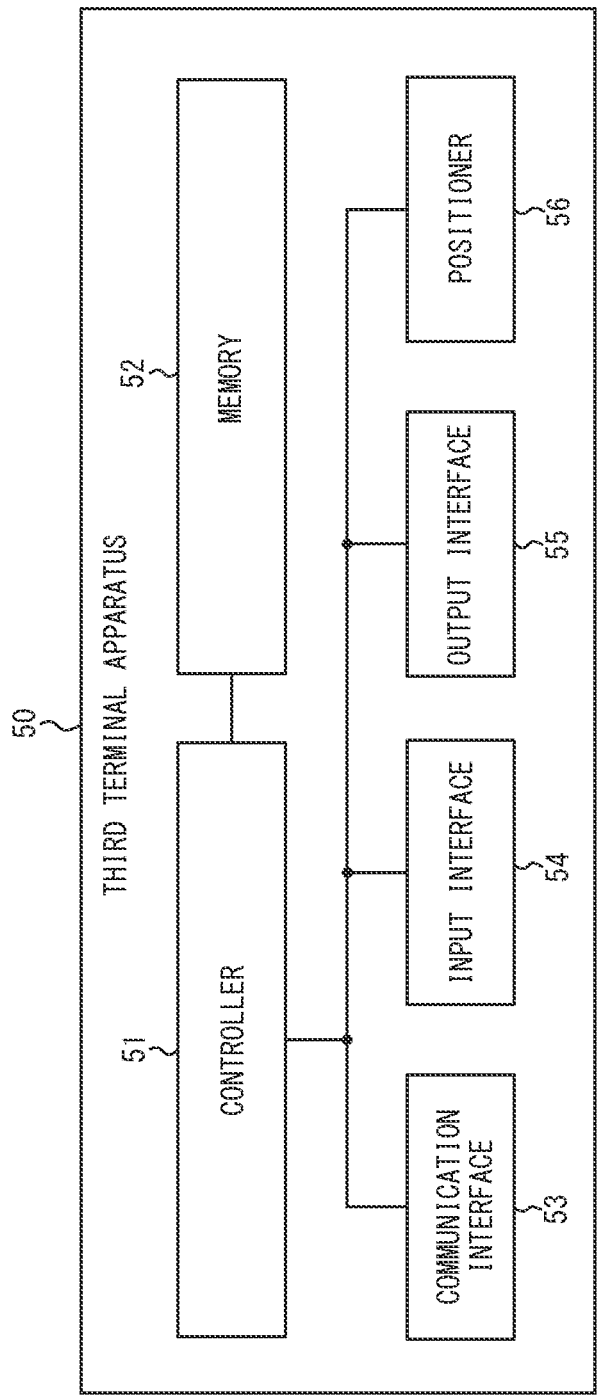
FIG. 5 is a block diagram illustrating a configuration of a third terminal apparatus according to the embodiment of the present disclosure.

A configuration of the third terminal apparatus 50 according to the present embodiment will be described with reference to FIG. 5.

The third terminal apparatus 50 includes a controller 51, a memory 52, a communication interface 53, an input interface 54, an output interface 55, and a positioner 56.

The controller 51 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 51 executes processes related to operations of the third terminal apparatus 50 while controlling each component of the third terminal apparatus 50.

The memory 52 includes at least one semiconductor memory, at least one magnetic memory, at least one optical memory, or a combination of at least two of these. The semiconductor memory is, for example, RAM or ROM. The RAM is, for example, SRAM or DRAM. The ROM is, for example, EEPROM. The memory 52 functions as, for example, a main memory, an auxiliary memory, or a cache memory. The memory 52 stores data to be used for the operations of the third terminal apparatus 50 and data obtained by the operations of the third terminal apparatus 50.

The communication interface 53 includes at least one interface for communication. The interface for communication is, for example, an interface compliant with a mobile communication standard such as LTE, the 4G standard, or the 5G standard, an interface compliant with a short-range wireless communication standard such as Bluetooth®, or a LAN interface. The communication interface 53 receives data to be used for the operations of the third terminal apparatus 50, and transmits data obtained by the operations of the third terminal apparatus 50.

The input interface 54 includes at least one interface for input. The interface for input is, for example, a physical key, a capacitive key, a pointing device, a touch screen integrally provided with a display, or a microphone. The input interface 54 accepts an operation for inputting data to be used for the operations of the third terminal apparatus 50. The input interface 54, instead of being included in the third terminal apparatus 50, may be connected to the third terminal apparatus 50 as an external input device. As the connection method, any technology such as USB, HDMI®, or Bluetooth® can be used.

The output interface 55 includes at least one interface for output. The interface for output is, for example, a display or a speaker. The display is, for example, an LCD or an organic EL display. The output interface 55 outputs data obtained by the operations of the third terminal apparatus 50. The output interface 55, instead of being included in the third terminal apparatus 50, may be connected to the third terminal apparatus 50 as an external output device such as a display audio. As the connection method, any technology such as USB, HDMI®, or Bluetooth® can be used.

The positioner 56 includes at least one GNSS receiver. GNSS includes, for example, GPS, QZSS, GLONASS, and/or Galileo. The positioner 56 measures the position of the third terminal apparatus 50.

The functions of the third terminal apparatus 50 are realized by execution of a third terminal program according to the present embodiment by a processor corresponding to the controller 51. That is, the functions of the third terminal apparatus 50 are realized by software. The third terminal program causes a computer to execute the operations of the third terminal apparatus 50, thereby causing the computer to function as the third terminal apparatus 50. That is, the computer executes the operations of the third terminal apparatus 50 in accordance with the third terminal program to thereby function as the third terminal apparatus 50.

Some or all of the functions of the third terminal apparatus 50 may be realized by a dedicated circuit corresponding to the controller 51. That is, some or all of the functions of the third terminal apparatus 50 may be realized by hardware.

Figure 6:
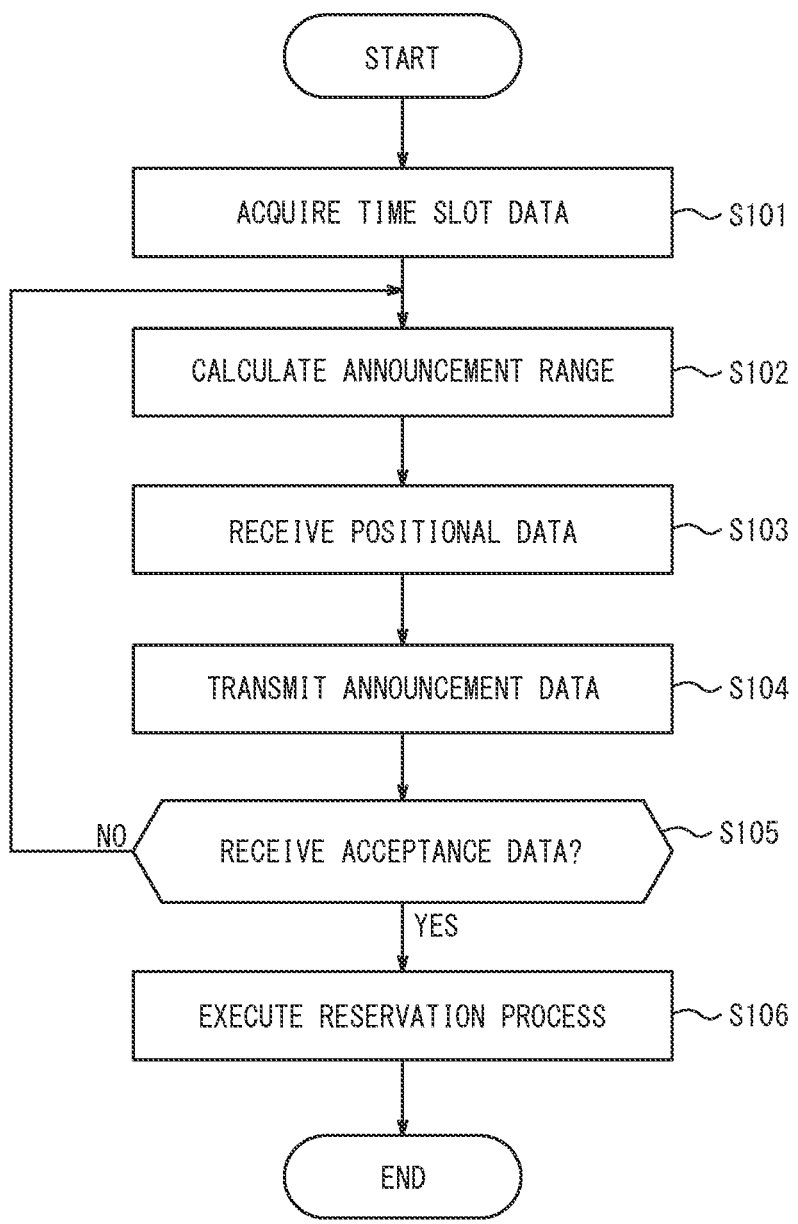
FIG. 6 is a diagram illustrating operations of the system according to the embodiment of the present disclosure.
Figure 7:
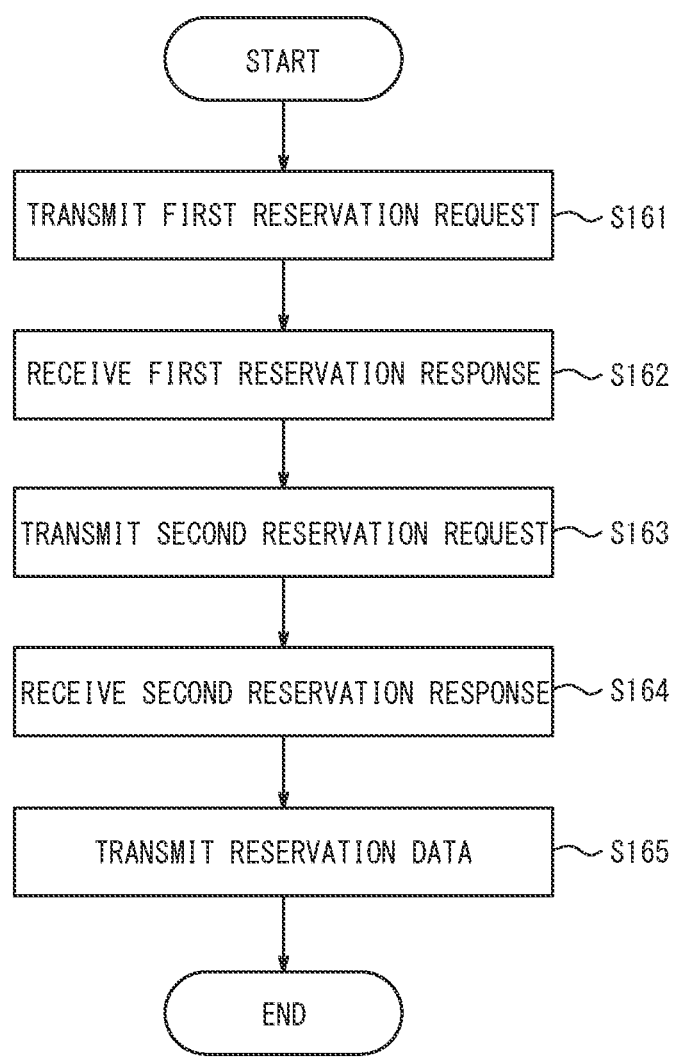
FIG. 7 is a diagram illustrating operations of the system according to the embodiment of the present disclosure.
Figure 8:
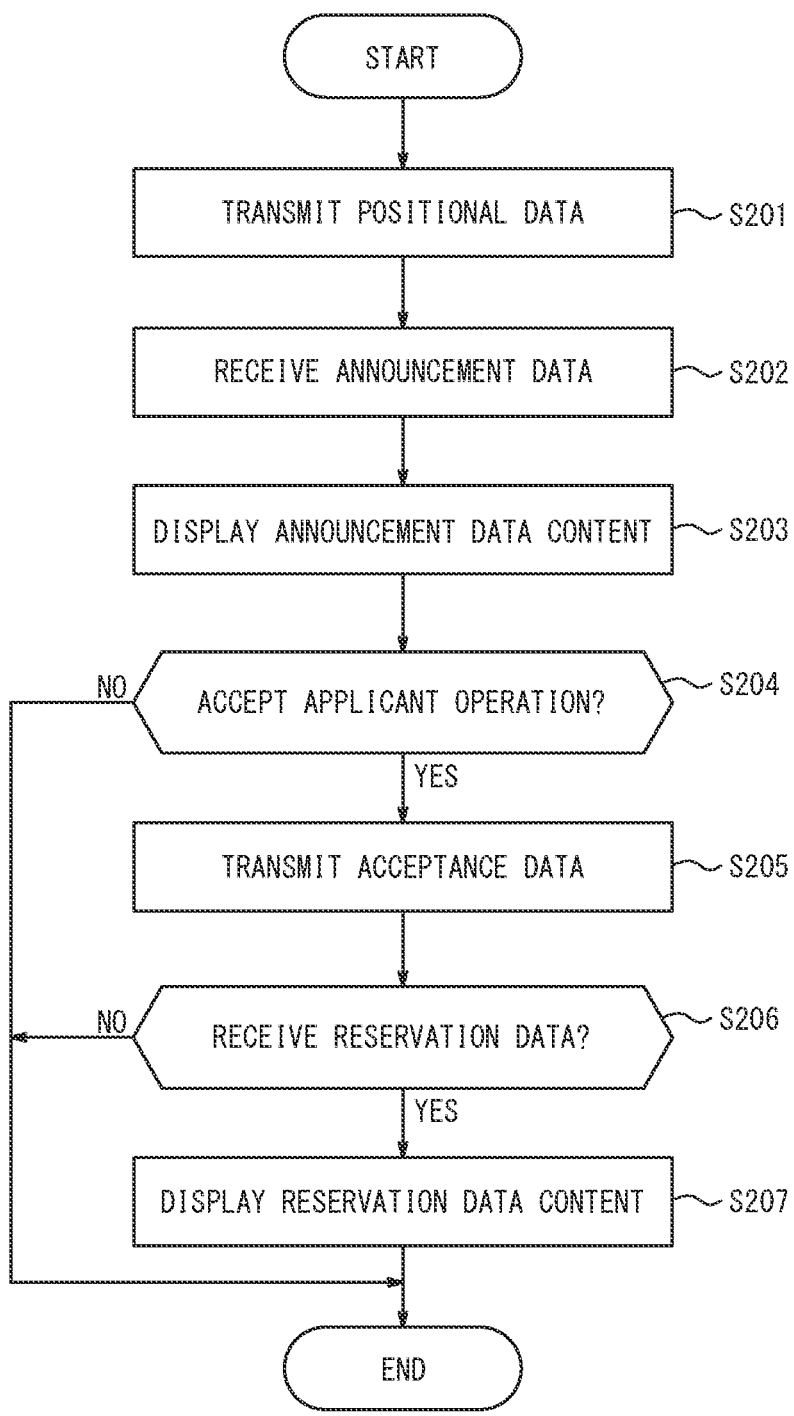
FIG. 8 is a diagram illustrating operations of the system according to the embodiment of the present disclosure.

Operations of the system 10 according to the present embodiment will be described with reference to FIGS. 6 to 8. These operations correspond to an announcement method according to the present embodiment. FIGS. 6 and 7 primarily illustrate operations of the control apparatus 20. FIG. 8 primarily illustrates operations of the second terminal apparatus 40.

In step S101 of FIG. 6, the controller 21 of the control apparatus 20 acquires time slot data D1. The time slot data D1 is data indicating an available time slot at a place 11 that provides a service.

As an illustrative example, suppose that the place 11 is restaurant X. Suppose that a restaurant staff member has accepted cancellation of a reservation for two adults at 19:00 on the day by telephone or the first terminal apparatus 30. In a case in which the reservation cancellation is accepted by the first terminal apparatus 30, the reservation cancellation is notified by email or via an external system such as an Internet-based reservation system. The "illustrative example" is not intended to limit the present disclosure, but rather to aid in understanding of the present embodiment.

The control apparatus 20 may acquire the time slot data D1 in any procedure, but, in the present embodiment, acquires the time slot data D1 from the first terminal apparatus 30 in the following procedure.

The input interface 34 of the first terminal apparatus 30 accepts an operation to input the time slot data D1 by the restaurant staff member. The time slot data D1 indicates an empty table for two adults at 19:00 on the day, as an available time slot at restaurant X. The controller 31 of the first terminal apparatus 30 controls the communication interface 33 to transmit the time slot data D1 input to the input interface 34. The communication interface 33 transmits the time slot data D1 to the control apparatus 20.

The communication interface 23 of the control apparatus 20 receives the time slot data D1 from the first terminal apparatus 30. The controller 21 of the control apparatus 20 acquires the time slot data D1 received by the communication interface 23. The controller 21 stores the acquired time slot data D1 in the memory 22.

In step S102 of FIG. 6, the controller 21 of the control apparatus 20 calculates an announcement range Rt for a proposal to take a user 12 to the place 11 using a vehicle 13 should the user 12 reserve the time slot, according to the remaining time until the time slot indicated by the time slot data D1. In the present embodiment, the controller 21 calculates, as the announcement range Rt, a location range for the user 12, from which the user 12 can be taken to the place 11 using the vehicle 13 by the time slot.

As an illustrative example, suppose that the vehicle 13 is taxi Y.

The control apparatus 20 may calculate the announcement range Rt in any procedure, but, in the present embodiment, calculates the announcement range Rt in the following procedure.

The controller 21 of the control apparatus 20 refers to map data D2 to identify the position of restaurant X. The map data D2 is data indicating the positions of various locations including restaurant X. The map data D2 may be stored in advance in the memory 22 of the control apparatus 20, or may be accumulated in an external system such as an Internet-based GIS. The term "GIS" is an abbreviation of geographic information system. The controller 21 calculates, as the announcement range Rt, a circle around the identified position of restaurant X with a radius corresponding to the remaining time until the available time slot. Specifically, the controller 21 calculates, as the announcement range Rt, a circle with a radius that is the product of a parameter P and the remaining time until 19:00 on the day, where the parameter P represents the distance that taxi Y can travel per hour, as a linear distance for convenience. The parameter P may be set in advance as a fixed parameter, or may be set each time as a variable parameter corresponding to traffic information obtained in real time, such as road conditions around restaurant X.

In step S103 of FIG. 6, the communication interface 23 of the control apparatus 20 receives positional data D4 for the second terminal apparatus 40.

As an illustrative example, suppose that each of a plurality of users Z, as a corresponding user 12, holds a corresponding second terminal apparatus 40. Suppose that each of the plurality of users Z has consented to periodic transmittal of positional data D4 from the corresponding second terminal apparatus 40 to the control apparatus 20.

The control apparatus 20 may receive the positional data D4 in any procedure, but, in the present embodiment, receives the positional data D4 from the second terminal apparatus 40 in the following procedure.

In step S201 of FIG. 8, the positioner 46 of the second terminal apparatus 40 measures the position of the second terminal apparatus 40. The controller 41 of the second terminal apparatus 40 controls the communication interface 43 to transmit, as the positional data D4, data indicating the position measured by the positioner 46. The communication interface 43 transmits the positional data D4 to the control apparatus 20.

The communication interface 23 of the control apparatus 20 receives the positional data D4 from the second terminal apparatus 40. The controller 21 of the control apparatus 20 acquires the positional data D4 received by the communication interface 23. The controller 21 stores the acquired positional data D4 in the memory 22.

In step S104 of FIG. 6, the controller 21 of the control apparatus 20 generates announcement data D5. The announcement data D5 is data announcing a proposal to take the user 12 to the place 11 using the vehicle 13 should the user 12 reserve the time slot indicated by the time slot data D1. The controller 21 controls the communication interface 23 to transmit the generated announcement data D5. The communication interface 23 transmits the announcement data D5 generated by the controller 21 to the second terminal apparatus 40, which is configured to present the content of data to the user 12. In the present embodiment, when the second terminal apparatus 40 is within the announcement range Rt, the controller 21 controls the communication interface 23 to transmit the announcement data D5.

The control apparatus 20 may transmit the announcement data D5 in any procedure, but, in the present embodiment, transmits the announcement data D5 in the following procedure.

For example, suppose that each of the plurality of users Z holds a smartphone as the second terminal apparatus 40. The controller 21 of the control apparatus 20 refers to the positional data D4 for each smartphone stored in the memory 22 to select a smartphone for receiving the announcement data D5. Specifically, if the position indicated by the positional data D4 for a smartphone is within the announcement range Rt, the controller 21 selects the smartphone for reception of the announcement data D5. If the position indicated by the positional data D4 for a smartphone is outside the announcement range Rt, the controller 21 excludes the smartphone from receiving the announcement data D5. The communication interface 23 of the control apparatus 20 transmits the announcement data D5 to the smartphone selected by the controller 21. That is, the controller 21 refers to the positional data D4 for each smartphone to determine whether each smartphone is within the announcement range Rt. When a smartphone is within the announcement range Rt, the controller 21 controls the communication interface 23 to transmit the announcement data D5 to the smartphone. The announcement data D5 announces a proposal to take the user 12 to restaurant X by taxi Y should the user 12 reserve the table for two adults at 19:00 on the day. The announcement data D5 may notify that the user 12 can receive a discount in restaurant X should the user 12 accept the proposal. The announcement data D5 may notify that restaurant X bears part or all of the fee of taxi Y.

In step S202 of FIG. 8, the communication interface 43 of the second terminal apparatus 40 that has been selected for receiving the announcement data D5 receives the announcement data D5 from the control apparatus 20. The controller 41 of the second terminal apparatus 40 acquires the announcement data D5 received by the communication interface 43. The controller 41 stores the acquired announcement data D5 in the memory 42.

Figure 9:
FIG. 9 is a diagram illustrating a screen example of the second terminal apparatus according to the embodiment of the present disclosure.

In step S203 of FIG. 8, the controller 41 of the second terminal apparatus 40 that has been selected for receiving the announcement data D5 presents the content of the announcement data D5 to the user 12 within the announcement range Rt. Specifically, the controller 41 controls the output interface 45 to output the content of the announcement data D5 stored in the memory 42. The output interface 45, in the present embodiment, displays the content of the announcement data D5 on a screen as illustrated in FIG. 9, but may output the content of the announcement data D5 by voice.

In step S204 of FIG. 8, the input interface 44 of the second terminal apparatus 40 that has been selected for receiving the announcement data D5 accepts an operation to input acceptance data D6 by the user 12. The acceptance data D6 is data indicating acceptance of the proposal in the announcement data D5. When a certain time period has elapsed without the operation by the user 12, the operations in FIG. 8 end.

In step S205 of FIG. 8, the controller 41 of the second terminal apparatus 40 that has been selected for receiving the announcement data D5 controls the communication interface 43 to transmit the acceptance data D6 input to the input interface 44. The communication interface 43 transmits the acceptance data D6 to the control apparatus 20.

In step S105 of FIG. 6, the communication interface 23 of the control apparatus 20 receives the acceptance data D6 from the second terminal apparatus 40. The controller 21 of the control apparatus 20 acquires the acceptance data D6 received by the communication interface 23. The controller 21 stores the acquired acceptance data D6 in the memory 22. When a certain time period has elapsed without reception of the acceptance data D6, the processes in and after step S102 of FIG. 6 are executed again.

In step S106 of FIG. 6, the controller 21 of the control apparatus 20 executes a reservation process that is a process for reserving the available time slot at the place 11 and dispatch of the vehicle 13, in response to the acceptance data D6.

The control apparatus 20 may execute the reservation process in any procedure, but, in the present embodiment, executes the reservation process in the following procedure.

In step S161 of FIG. 7, the controller 21 of the control apparatus 20 controls the communication interface 23 to transmit a first reservation request Q1. The first reservation request Q1 is data requesting a reservation for a table for two adults at 19:00 on the day. The communication interface 23 transmits the first reservation request Q1 to the first terminal apparatus 30.

The communication interface 33 of the first terminal apparatus 30 receives the first reservation request Q1 from the control apparatus 20. The controller 31 of the first terminal apparatus 30 acquires the first reservation request Q1 received by the communication interface 33. The controller 31 stores the acquired first reservation request Q1 in the memory 32. The controller 31 presents the content of the first reservation request Q1 to the restaurant staff member. Specifically, the controller 31 controls the output interface 35 to output the content of the first reservation request Q1 stored in the memory 32. The output interface 35, in the present embodiment, displays the content of the first reservation request Q1 on a screen, but may output the content of the first reservation request Q1 by voice.

In step S162 of FIG. 7, the input interface 34 of the first terminal apparatus 30 accepts an operation to input a first reservation response R1 by the restaurant staff member. The first reservation response R1 is data indicating that the table for two adults at 19:00 on the day has been reserved in restaurant X. The controller 31 of the first terminal apparatus 30 controls the communication interface 33 to transmit the first reservation response R1 input to the input interface 34. The communication interface 33 transmits the first reservation response R1 to the control apparatus 20.

The communication interface 23 of the control apparatus 20 receives the first reservation response R1 from the first terminal apparatus 30. The controller 21 of the control apparatus 20 acquires the first reservation response R1 received by the communication interface 23. The controller 21 stores the acquired first reservation response R1 in the memory 22.

In step S163 of FIG. 7, the controller 21 of the control apparatus 20 controls the communication interface 23 to transmit a second reservation request Q2. The second reservation request Q2 is data requesting that the user 12 holding the second terminal apparatus 40, from which the acceptance data D6 has been transmitted, be taken to restaurant X by taxi Y. The communication interface 23 transmits the second reservation request Q2 to the third terminal apparatus 50.

The communication interface 53 of the third terminal apparatus 50 receives the second reservation request Q2 from the control apparatus 20. The controller 51 of the third terminal apparatus 50 acquires the second reservation request Q2 received by the communication interface 53. The controller 51 stores the acquired second reservation request Q2 in the memory 52. The controller 51 presents the content of the second reservation request Q2 to the driver of taxi Y. Specifically, the controller 51 controls the output interface 55 to output the content of the second reservation request Q2 stored in the memory 52. The output interface 55, in the present embodiment, displays the content of the second reservation request Q2 on a screen, but may output the content of the second reservation request Q2 by voice.

In step S164 of FIG. 7, the input interface 54 of the third terminal apparatus 50 accepts an operation to input a second reservation response R2 by the driver of taxi Y. The second reservation response R2 is data indicating that dispatch of taxi Y has been reserved. The controller 51 of the third terminal apparatus 50 controls the communication interface 53 to transmit the second reservation response R2 input to the input interface 54. The communication interface 53 transmits the second reservation response R2 to the control apparatus 20.

The communication interface 23 of the control apparatus 20 receives the second reservation response R2 from the third terminal apparatus 50. The controller 21 of the control apparatus 20 acquires the second reservation response R2 received by the communication interface 23. The controller 21 stores the acquired second reservation response R2 in the memory 22.

In step S165 of FIG. 7, the controller 21 of the control apparatus 20 controls the communication interface 23 to transmit reservation data D7. The reservation data D7 is data indicating that the table for two adults at 19:00 on the day has been reserved in restaurant X, and that the dispatch of taxi Y has been reserved. The communication interface 23 transmits the reservation data D7 to the second terminal apparatus 40, from which the acceptance data D6 has been transmitted.

In step S206 of FIG. 8, the communication interface 43 of the second terminal apparatus 40, from which the acceptance data D6 has been transmitted, receives the reservation data D7 from the control apparatus 20. The controller 41 of the second terminal apparatus 40 acquires the reservation data D7 received by the communication interface 43. The controller 41 stores the acquired reservation data D7 in the memory 42. When a certain time period has elapsed without reception of the reservation data D7, the operations in FIG. 8 end.

In step S207 of FIG. 8, the controller 41 of the second terminal apparatus 40, from which the acceptance data D6 has been transmitted, presents the content of the reservation data D7 to the user 12. Specifically, the controller 41 controls the output interface 45 to output the content of the reservation data D7 stored in the memory 42. The output interface 45, in the present embodiment, displays the content of the reservation data D7 on the screen, but may output the content of the reservation data D7 by voice.

In a case in which the processes from step S102 to step S104 of FIG. 6 are executed a plurality of times, the controller 21 of the control apparatus 20 calculates the announcement range Rt a plurality of times. Each time the announcement range Rt is newly calculated, the controller 21 determines whether the second terminal apparatus 40 is within a range newly calculated as the announcement range Rt. When the second terminal apparatus 40 is within the range newly calculated as the announcement range Rt, the controller 21 controls the communication interface 23 to transmit the announcement data D5.

For example, suppose that each of the plurality of users Z holds a smartphone as a corresponding second terminal apparatus 40. Even if the position indicated by the positional data D4 for a smartphone is within a range previously calculated as the announcement range Rt, if the position indicated by the positional data D4 for the smartphone is outside the range newly calculated as the announcement range Rt, the controller 21 stops transmission of the announcement data D5 to the smartphone. That is, each time the announcement range Rt is newly calculated, the controller 21 refers to the positional data D4 for each smartphone to determine whether each smartphone is within the range newly calculated as the announcement range Rt. When a smartphone is within the range newly calculated as the announcement range Rt, the controller 21 controls the communication interface 23 to transmit the announcement data D5 to the smartphone. When a smartphone is outside the range newly calculated as the announcement range Rt, the controller 21 excludes the smartphone from receiving the announcement data D5.

As described above, in the present embodiment, the controller 21 of the control apparatus 20 acquires time slot data D1 indicating an available time slot at a place 11 that provides a service. The controller 21 generates announcement data D5 announcing a proposal to take a user 12 to the place 11 using a vehicle 13 should the user 12 reserve the time slot indicated by the time slot data D1. The communication interface 23 of the control apparatus 20 transmits the announcement data D5 generated by the controller 21 to the second terminal apparatus 40, which is configured to present the content of data to the user 12.

According to the present embodiment, it is possible to strongly motivate the user 12 to reserve the available time slot by proposing that a ride on the vehicle 13 be given to any user who reserves the available time slot. As a result, available time slots may be more likely to be filled.

In the present embodiment, the controller 21 calculates, as the announcement range Rt, a smaller range as the remaining time until the available time slot becomes shorter. That is, the announcement range Rt becomes smaller as the remaining time until the available time slot becomes shorter.

According to the present embodiment, the announcement range Rt can be gradually reduced as time elapses.

In the present embodiment, the communication interface 43 of the second terminal apparatus 40 receives announcement data D5 announcing a proposal to take a user 12 to a place 11 that provides a service, using a vehicle 13, should the user 12 reserve an available time slot at the place 11. The controller 41 of the second terminal apparatus 40 presents, to the user 12, the content of the announcement data D5 received by the communication interface 43.

According to the present embodiment, the user 12 can know of the existence of the available time slot. The user 12 who has reserved the available time slot can receive the privilege of being given a ride on the vehicle 13. Therefore, the convenience is improved.

As a variation of the present embodiment, the announcement range Rt may be set according to the travel distance to restaurant X instead of the linear distance to restaurant X.

For example, in step S102 of FIG. 6, the controller 21 of the control apparatus 20 refers to the map data D2 to retrieve routes from a plurality of locations, at which the user 12 may be present, to restaurant X. The controller 21 may retrieve the routes independently, or may retrieve the routes using an external system such as an Internet-based GIS. The controller 21 calculates the time required when taxi Y travels on each retrieved route from the corresponding location to restaurant X. The controller 21 may calculate the required time independently, or may calculate the required time using an external system such as an Internet-based GIS. The controller 21 sets, as the announcement range Rt, an area including a location with respect to which the calculated required time is shorter than the remaining time until 19:00 on the day, and not including a location with respect to which the calculated required time is longer than the remaining time.

According to this variation, it is possible to set, as the announcement range Rt, a range in which more potential customers are present, and from which the user 12 can be more reliably delivered to restaurant X by the available time slot.

As a further variation, the travel time period from the current position of taxi Y may be taken into account.

For example, the positioner 56 of the third terminal apparatus 50 measures the position of the third terminal apparatus 50. The controller 51 of the third terminal apparatus 50 controls the communication interface 53 to transmit positional data D3 indicating the position measured by the positioner 56 as the current position of taxi Y. The communication interface 53 transmits the positional data D3 to the control apparatus 20.

In step S102 of FIG. 6, the communication interface 23 of the control apparatus 20 receives the positional data D3 from the third terminal apparatus 50. The controller 21 of the control apparatus 20 acquires the positional data D3 received by the communication interface 23. The controller 21 stores the acquired positional data D3 in the memory 22. The controller 21 refers to the map data D2 to retrieve not only the routes from the plurality of locations at which the user 12 may be present to restaurant X, but also routes from the position indicated by the positional data D3 stored in the memory 22 to the plurality of locations. The controller 21 calculates the time required when taxi Y travels on each retrieved route from the current position of taxi Y to restaurant X. The controller 21 sets, as the announcement range Rt, an area including a location with respect to which the calculated required time is shorter than the remaining time until 19:00 on the day, and not including a location with respect to which the calculated required time is longer than the remaining time.

According to this variation, even if taxi Y is not close to the position of the user 12, it is possible to set, as the announcement range Rt, a range from which the user 12 can be reliably delivered to restaurant X by the available time slot.

As a variation of the present embodiment, instead of periodically transmitting the positional data D4 from the second terminal apparatus 40 to the control apparatus 20, the positional data D4 may be transmitted from the second terminal apparatus 40 to the control apparatus 20 upon a request from the control apparatus 20.

As a variation of the present embodiment, the second terminal apparatus 40 may be installed at each of a plurality of locations such as a station and a shopping mall.

In this variation, the processes in step S103 of FIG. 6 and step S201 of FIG. 8 can be omitted.

For example, suppose that a digital signage device is installed as the second terminal apparatus 40 at each of the plurality of locations. In step S104 of FIG. 6, the controller 21 of the control apparatus 20 refers to the map data D2 to select a digital signage device for receiving the announcement data D5 from among the digital signage devices installed at the plurality of locations. Specifically, if any location at which a digital signage device is installed is included in the announcement range Rt, the controller 21 selects the digital signage device for reception of the announcement data D5. If any location at which a digital signage device is installed is not included in the announcement range Rt, the controller 21 excludes the digital signage device from receiving the announcement data D5. The communication interface 23 of the control apparatus 20 transmits the announcement data D5 to the digital signage device selected by the controller 21. That is, the controller 21 refers to the map data D2, which indicates the location at which each digital signage device is installed, to determine whether each digital signage device is within the announcement range Rt. When a digital signage device is within the announcement range Rt, the controller 21 controls the communication interface 23 to transmit the announcement data D5 to the digital signage device.

The processes from step S204 to step S207 of FIG. 8 may be executed by the digital signage device selected for receiving the announcement data D5, or may be executed by another terminal apparatus such as a smartphone held by the user 12.

As a variation of the present embodiment, data indicating the announcement range Rt may be included in the announcement data D5. The second terminal apparatus 40 for receiving the announcement data D5 may not be selected by the control apparatus 20.

Also in this variation, the processes in step S103 of FIG. 6 and step S201 of FIG. 8 can be omitted.

For example, suppose that each of the plurality of users Z holds a smartphone as the second terminal apparatus 40. In step S104 of FIG. 6, the controller 21 of the control apparatus 20 controls the communication interface 23 to transmit the announcement data D5, which includes the data indicating the announcement range Rt, without selecting a smartphone for receiving the announcement data D5. The communication interface 23 transmits the announcement data D5 to the second terminal apparatus 40 held by each of the plurality of users Z. That is, the controller 21 includes the data indicating the announcement range Rt in the announcement data D5. Regardless of whether each smartphone is within the announcement range Rt, the controller 21 controls the communication interface 23 to transmit the announcement data D5 to each smartphone.

In step S202 of FIG. 8, the communication interface 43 of the second terminal apparatus 40 held by each of the plurality of users Z receives the announcement data D5 from the control apparatus 20. The controller 41 of the second terminal apparatus 40 acquires the announcement data D5 received by the communication interface 43. The controller 41 stores the acquired announcement data D5 in the memory 42. The positioner 46 of the second terminal apparatus 40 measures the position of the second terminal apparatus 40. The controller 41 refers to the announcement data D5 to determine whether the position measured by the positioner 46 is within the announcement range Rt indicated by the data included in the announcement data D5. If the position of the second terminal apparatus 40 is within the announcement range Rt, it is allowed to present the content of the announcement data D5 to the user 12 who is within the announcement range Rt. Therefore, in step S204 of FIG. 8, the controller 41 controls the output interface 45 to output the content of the announcement data D5. If the position of the second terminal apparatus 40 is outside the announcement range Rt, it is not allowed to present the content of the announcement data D5 to the user 12 who is within the announcement range Rt. Therefore, the controller 41 does not control the output interface 45 to output the content of the announcement data D5.

According to this variation, it is possible to reduce the processing load of the control apparatus 20.

As a variation of the present embodiment, the acceptance data D6 may include data indicating either a location at which the user 12 is present or a boarding location desired by the user 12. If the location indicated by the acceptance data D6 is not included in the announcement range Rt, the reservation process may not be executed by the control apparatus 20. That is, it may be determined whether the reservation process is to be executed depending on whether the user 12 can be taken from the location indicated by the acceptance data D6 to the place 11 using the vehicle 13 by the available time slot at the place 11.

For example, in step S106 of FIG. 6, the controller 21 of the control apparatus 20 determines whether to execute the reservation process depending on whether the location indicated by the acceptance data D6 stored in the memory 22 is included in the announcement range Rt. That is, if the location at which the user 12 is present is included in the announcement range Rt, the controller 21 executes the reservation process. If the location at which the user 12 is present is not included in the announcement range Rt, the controller 21 does not execute the reservation process. Moreover, if the boarding location desired by the user 12 is included in the announcement range Rt, the controller 21 executes the reservation process. If the boarding location desired by the user 12 is not included in the announcement range Rt, the controller 21 does not execute the reservation process. When the location indicated by the acceptance data D6 is included in the announcement range Rt, the controller 21 notifies the driver of taxi Y of the location by including the data indicating the location in the second reservation request Q2 in the reservation process.

In this variation, the second terminal apparatus 40 for receiving the announcement data D5 may not be selected by the control apparatus 20.

As a variation of the present embodiment, a reservation for the table for two adults at 19:00 on the day may be requested from the control apparatus 20 to the first terminal apparatus 30 via an external system such as an Internet-based reservation system.

As a variation of the present embodiment, it may be notified from the first terminal apparatus 30 to the control apparatus 20 that the table for two adults at 19:00 on the day has been reserved at restaurant X, via an external system such as an Internet-based reservation system.

As a variation of the present embodiment, it may be requested from the control apparatus 20 to the third terminal apparatus 50 that the user 12 be taken to restaurant X by taxi Y, via an external system such as an Internet-based vehicle dispatch system.

As a variation of the present embodiment, it may be notified from the third terminal apparatus 50 to the control apparatus 20 that dispatch of taxi Y has been reserved, via an external system such as an Internet-based vehicle dispatch system.

The present disclosure is not limited to the embodiments described above. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A control apparatus comprising:
a communication interface; and
a processor programmed to:
  acquire, via the communication, interface, time slot data indicating an available time slot at a place that provides a service, the available time slot having become available due to a cancelation of a previous reservation for the time slot;
  calculate an announcement range by:
    accessing stored map data;
    identifying a location of the place within the accessed map data;
    calculating a time until the available time slot; and
    calculating a circle having:
      a center located at the identified location of the place; and
      a radius with a length determined based on (i) a predicted speed of a candidate vehicle, and (ii) the calculated time until the available time slot;
  receive, via the communication interface, positional data indicating a position of a candidate terminal apparatus;
  based on the stored map data, the calculated circle, and the positional data, determine whether the position of the candidate terminal apparatus is located within the calculated circle;
  in response to a determination that the position of the candidate terminal apparatus is located within the calculated circle, generate announcement data offering a free ride to a user of the candidate terminal apparatus to the place using the candidate vehicle should the user reserve the time slot indicated by the time slot data; and
  transmit, via the communication interface, the generated announcement data the candidate terminal apparatus;
  receive, via the communication interface, an acceptance of the transmitted announcement data;
  transmit, via the communication interface, an indication that the available time slot has been accepted; and
  transmit, via the communication interface, dispatch instructions instructing a driver of the candidate vehicle to pick up the user of the candidate terminal apparatus and transport the user of the candidate terminal apparatus to the place before the time slot.

2. The control apparatus according to claim 1, wherein the processor is programmed to:
repeatedly calculate the announcement range a plurality of times; and
each time the announcement range is calculated, determine whether the position of the candidate terminal apparatus is within the calculated circle.

3. The control apparatus according to claim 1, wherein the processor is programmed to include data indicating the announcement range in the generated announcement data.

4. The control apparatus according to claim 1, wherein the acceptance of the transmitted announcement data includes data indicating either a location at which the user is present or a boarding location desired by the user.

5. A system comprising:
a control apparatus comprising:
  a communication interface; and
  a processor programmed to:
    acquire, via the communication, interface, time slot data indicating an available time slot at a place that provides a service, the available time slot having become available due to a cancelation of a previous reservation for the time slot;
    calculate an announcement range by:
      accessing stored map data;
      identifying a location of the place within the accessed map data;
      calculating a time until the available time slot; and
      calculating a circle having:
        a center located at the identified location of the place; and
        a radius with a length determined based on (i) a predicted speed of a candidate vehicle, and (ii) the calculated time until the available time slot;
    receive, via the communication interface, positional data indicating a position of a candidate terminal apparatus;
    based on the stored map data, the calculated circle, and the positional data, determine whether the position of the candidate terminal apparatus is located within the calculated circle;
    in response to a determination that the position of the candidate terminal apparatus is located within the calculated circle, generate announcement data offering a free ride to a user of the candidate terminal apparatus to the place using the candidate vehicle should the user reserve the time slot indicated by the time slot data; and transmit, via the communication interface, the generated announcement data the candidate terminal apparatus;

receive, via the communication interface, an acceptance of the transmitted announcement data;

transmit, via the communication interface, an indication that the available time slot has been accepted; and transmit, via the communication interface, dispatch instructions instructing a driver of the candidate vehicle to pick up the user of the candidate terminal apparatus and transport the user of the candidate terminal apparatus to the place before the time slot; and the candidate terminal apparatus.

6. The system according to claim 5, wherein the processor is programmed to:

repeatedly calculate the announcement range a plurality of times; and each time the announcement range is calculated, determine whether the position of the candidate terminal apparatus is within the calculated circle.

7. The system according to claim 5, wherein the processor is programmed to include data indicating the announcement range in the generated announcement data.

8. The system according to claim 5, wherein the acceptance of the transmitted announcement data includes data indicating either a location at which the user is present or a boarding location desired by the user.

9. An announcement method implemented by a processor of a control apparatus, the method comprising:

acquiring, via a communication, interface, time slot data indicating an available time slot at a place that provides a service, the available time slot having become available due to a cancelation of a previous reservation for the time slot;

calculating an announcement range by:
accessing stored map data;
identifying a location of the place within the accessed map data;
calculating a time until the available time slot; and calculating a circle having:
a center located at the identified location of the place; and
a radius with a length determined based on (i) a predicted speed of a candidate vehicle, and (ii) the calculated time until the available time slot;

receiving, via the communication interface, positional data indicating a position of a candidate terminal apparatus;

based on the stored map data, the calculated circle, and the positional data, determining whether the position of the candidate terminal apparatus is located within the calculated circle;

in response to a determination that the position of the candidate terminal apparatus is located within the calculated circle, generating announcement data offering a free ride to a user of the candidate terminal apparatus to the place using the candidate vehicle should the user reserve the time slot indicated by the time slot data; and transmitting, via the communication interface, the generated announcement data to the candidate terminal apparatus;

receiving, via the communication interface, an acceptance of the transmitted announcement data;

transmitting, via the communication interface, an indication that the available time slot has been accepted; and transmitting, via the communication interface, dispatch instructions instructing a driver of the candidate vehicle to pick up the user of the candidate terminal apparatus and transport the user of the candidate terminal apparatus to the place before the time slot.

10. The announcement method according to claim 9, further comprising:

repeatedly calculating the announcement range a plurality of times; and each time the announcement range is calculated, determining whether the position of the candidate terminal apparatus is within the calculated circle.

11. The announcement method according to claim 9, further comprising including data indicating the announcement range in the generated announcement data.

12. The announcement method according to claim 9, wherein the acceptance of the transmitted announcement data includes data indicating either a location at which the user is present or a boarding location desired by the user.

* * * * *